June 14, 1949.
H. GANG
2,473,471
CARRIAGE CUSHIONING MEANS FOR
CALCULATING MACHINES
Filed Sept. 17, 1948
2 Sheets-Sheet 2
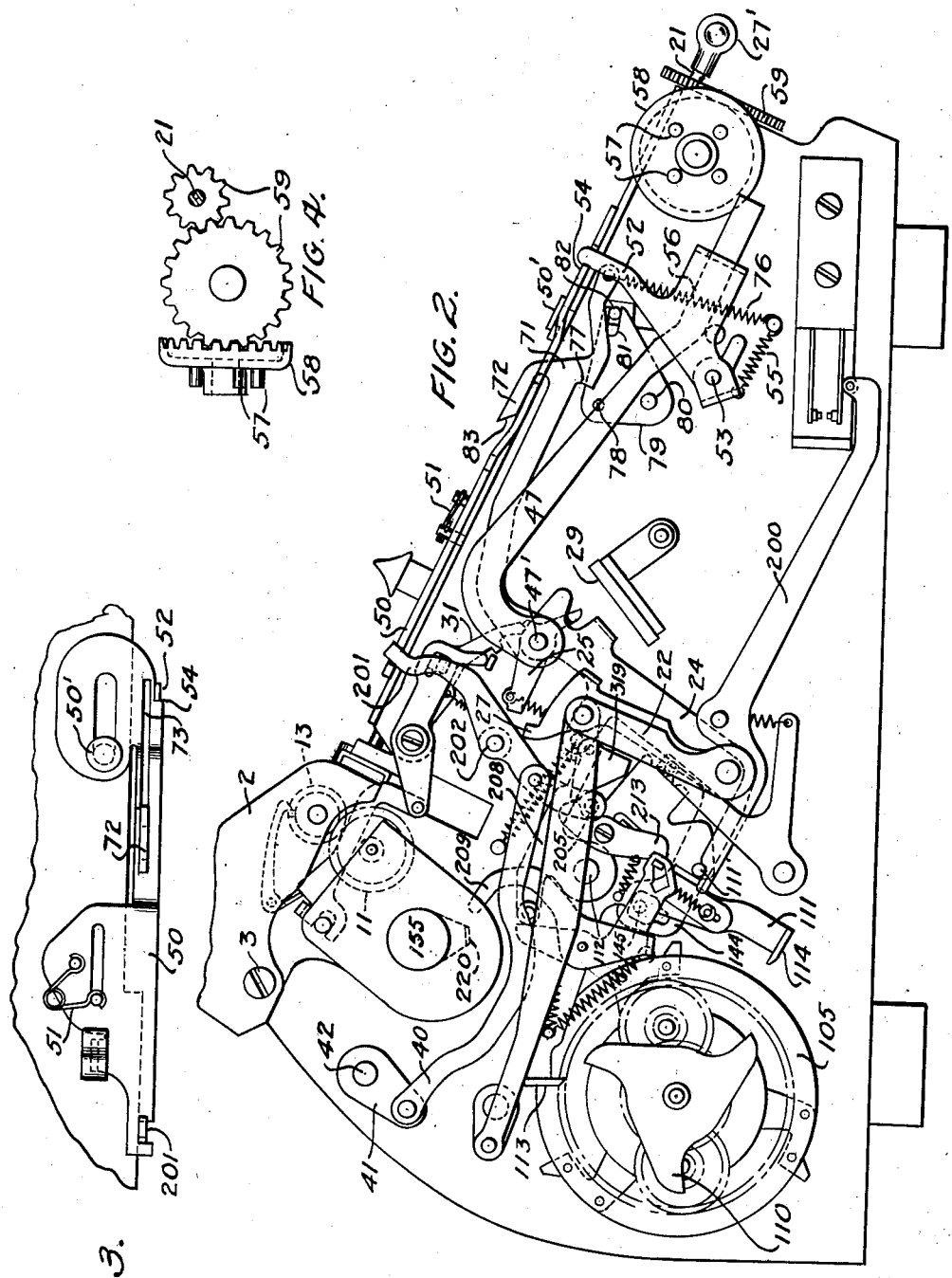
INVENTOR.
Herman Gang
BY E.W. Anderson & Son.
attorneys.

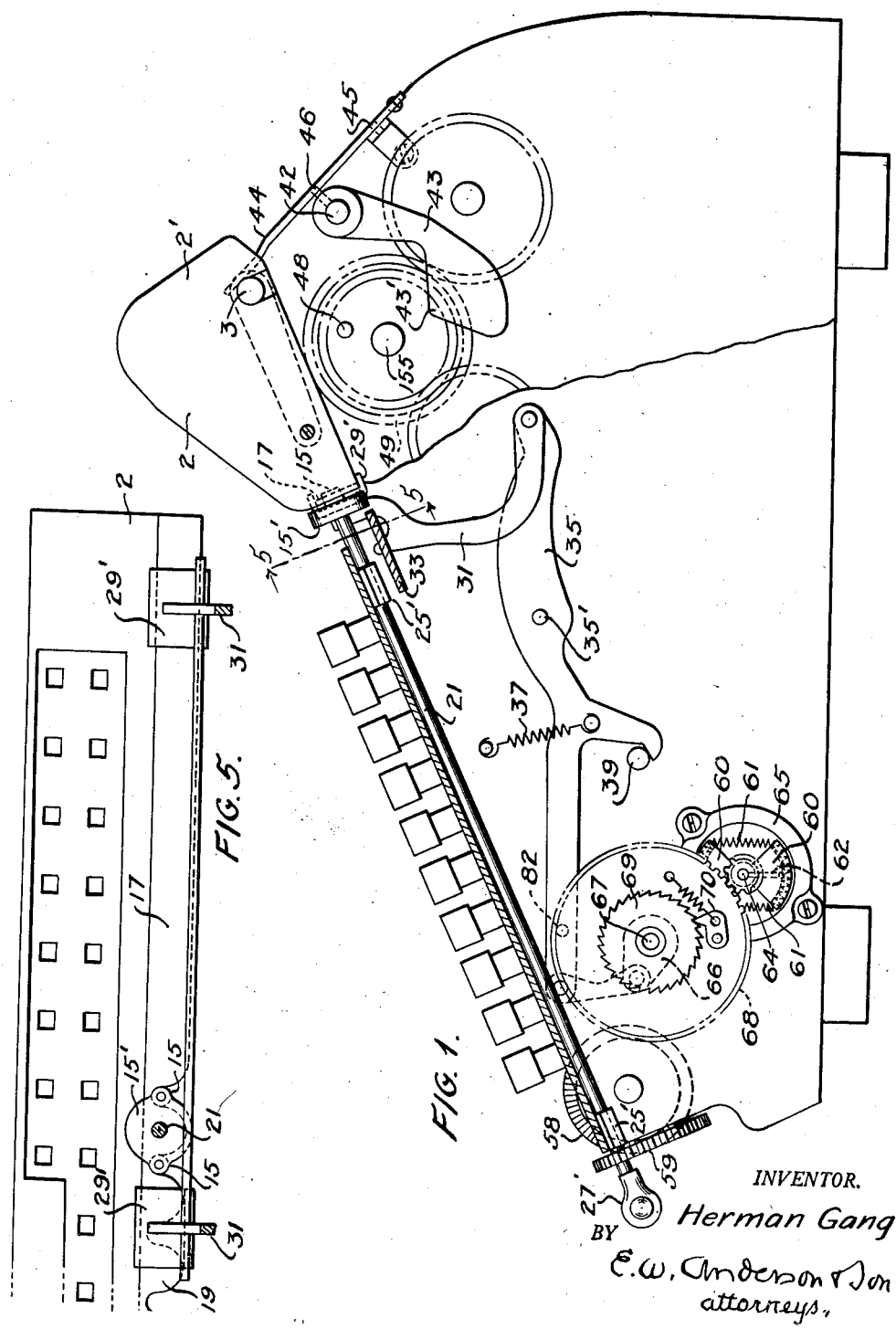

Patented June 14, 1949

2,473,471

UNITED STATES PATENT OFFICE 2,473,471

CARRIAGE CUSHIONING MEANS FOR CALCULATING MACHINES

Herman Gang, Livingston, N. J., assignor to Monroe Calculating Machine Company, Orange, N. J., a corporation of Delaware Application September 17, 1948, Serial No. 49,792

3 Claims. (Cl. 235—63)

The invention relates to calculating machines, such for instance as disclosed in the U. S. patent to Overbury, No. 1,964,211, dated June 26, 1934, wherein the denominationally shiftable register carriage is pivoted in rear upon the fixed frame, and means is provided to raise the carriage pivotally to clear the register gears from transmission gears of the fixed frame and to cause the carriage to fall by gravity to reengage said gears in the denominational shift of the carriage from one to another order; and means is provided to open the main clutch of the machine upon the conclusion of a calculation of a plural order program in any one ordinal position of the carriage and to thereafter reclose the clutch to start the calculation in the new ordinal position of the carriage.

An object of the invention is to provide means for cushioning the fall of the carriage in its shift to the new ordinal position. Another object is to provide means for synchronizing the operation of the means for cushioning the fall of the carriage in its shift to the new ordinal position with the operation of the means for reclosing the clutch to start the calculation in the new ordinal position of the carriage. Other objects and advantages will appear hereinafter or will be obvious.

The invention consists in the novel construction and combinations of parts as hereinafter set forth in the claims.

In the accompanying drawings,

Figure 1 is a right side view of the invention as applied.

Figure 2 is a left side view of the invention as applied.

Figure 3 is a detail fragmentary plan view of the slide plate and associated parts.

Figure 4 is a detail side view of the crown gear and its gear connection with the carriage shift shaft.

Figure 5 is a detail section on the line 5—5, Figure 1.

The invention is shown as applied to a Monroe calculating machine constructed in accordance with the disclosure of said Overbury patent, with certain modifications that will hereinafter appear, with the proviso that the machine is constructed to operate on the subtract-shift, add-shift method of accomplishing automatic division as disclosed for instance in the U. S. patent to Chase, No. 1,773,027, dated August 12, 1930, inasmuch as the illustrated shifting means provides for a carriage shift operation immediately succeeding a subtractive or alternatively an additive operation of the differential actuating means of the machine.

In the drawings, the totalizer gears 13 of the product-dividend register are mounted on a denominationally shiftable carriage 2, and are rotated additively or alternatively subtractively upon operation of the forwardly or reversely driven differential actuator gears having driving connection with the totalizer gears through the medium of transmission gears 11 of the fixed frame. The differential actuator gears are driven by an electric motor through the medium of differential gear clutch and reversing means constituting the main clutch of the machine. Means are provided to open the clutch upon the conclusion of a calculation of a multiplication or alternatively a division program in any one ordinal position of the carriage and to thereafter reclose the clutch to start the calculation in the new ordinal position of the carriage as explained in the disclosure of said Overbury and Chase patents.

Division is accomplished in known manner by subtracting the divisor from the higher orders of the dividend until a negative reading appears on the visible numeral wheels of the totalizer gears 13, thereupon shifting the carriage and reversing the operation of the machine until a positive reading appears on said numeral wheels, and repeating the operation, whereupon the quotient will appear on the multiplier-quotient register (not shown). This is effected automatically upon adjusting the division lever 201 to effective position.

Division lever 201 is fulcrumed to the fixed frame at 202, and in being adjusted to rearward effective position will bring pin 205 thereof into engagement with a click pawl 319, mounted upon the forward end of an arm 208, which arm is pivoted upon the fulcrum 112 of the reversing clutch lever 111 of the gear clutch and reversing means. In this movement, pin 205 will rock the arm 208, a projection on the rearward end of said arm engaging clutch lever 111 to bring the hook end 113 thereof into engagement with the subtraction clutch member 110 of the clutch and reversing means, thus closing the clutch and setting the machine in operation subtractively. Pin 205 passes entirely beyond pawl 319 in this movement, thus leaving the clutch lever 111 free to be adjusted to neutral position.

A reversing tooth 209 is pivotally mounted upon the clutch lever 111, being normally held in ineffective position by a suitable spring.

As the division lever 201 is adjusted to effective position, arm 208 will contact said reversing tooth 209 and rock the same counterclockwise about its pivot, until it is caught and held in effective position by latch 213.

In this effective position, reversing tooth 209 is so located, that whenever said clutch lever 111 is adjusted to its neutral position, the upper end of said tooth 209 will be in the path of movement of a pin 220 of a crank arm fast upon a transverse shaft 155.

Upon the conclusion of a quotient figure registration in each denominational order, the registration in this order is terminated, operation of the machine is reversed, and the registration in the next order is initiated by means of the full cycle stopping means of the machine and additional means for modifying the operation of the full cycle stopping means, all of these means being controlled in their operation through the medium of trigger 31.

Trigger 31 normally engages a spring-urged pawl 25 mounted upon rock arm 24 and holds said pawl in ineffective position against the tension of its spring.

Upon movement of a higher order numeral wheel 13 from 0 to 9 or from 9 to 0 registering position, trigger 31 will be raised and pawl 25 released, the latter thereupon engaging a shoulder 27 of rock arm 22 driven from one of the main operating shafts of the machine. Engagement of pawl 25 with shoulder 27 connects the arms 22 and 24 to be driven in unison, the arm 24 being carried against a fixed stop 29 to prevent further rotation of the parts in the original direction. Upon the rebound of the parts from stop 29, a lug of pawl 25 will engage trigger 31, and said pawl will be lifted from engagement with shoulder 27. In the movement of rock arm 24 against stop 29, a rearward extension 144 of arm 24 will engage a pin 145 of clutch lever 111 and through one or the other of cam edges of said extension 144 will move said clutch lever 111 to its neutral position to open the clutch. As the actuators return, with arms 22 and 24, to full cycle position, pin 220 will contact tooth 209, and will move hook end 114 of clutch lever 111 to engage the additive clutch member 105 of the clutch and reversing means and start the calculation in the new ordinal position of the carriage. Clutch lever 111 in moving to additive or alternatively to subtractive position is adapted by engagement of a pin 111' thereof to actuate a lever 200 and close the contacts of a circuit maker and breaker 200' interposed in the motor circuit.

Restoration of division lever 201

Upon adjustment of the division lever 201 to effective position, a link 40 connecting it with a crank arm 41 fast upon a transverse shaft 42 will rock said shaft and rock upwardly a crank arm 43 fast upon the other end of said shaft 42.

Upon the carriage being shifted to extreme left hand position in the completion of a calculation of division, the carriage frame 2' will engage the upper arm of a lever 44, fulcrumed to the fixed frame at 45, and actuate said lever, the latter having a pin 46 of its upper arm engaging the hub of said crank arm 43 to shift said crank arm 43 and its shaft 42 as a unit laterally to bring a cam edge 43' of said crank arm, (previously rocked upwardly as stated) into the path of movement of a pin 48 upon one of the actuator drive gears 49 forming part of the differential actuating means of the machine to, during the first cycle of rotation of the differential actuating means, depress crank arm 43 and rock shaft 42 reversely to restore the division lever 201.

Carriage shifting means

The upper end of the division lever 201 engages a lateral notch of a slide plate 50 having a slot engaging a pin 50' of the keyboard plate at the left side thereof, so that when the slide plate is moved rearwardly the division lever 201 is adjusted to effective position, a toggle spring 51 having end connection with the slide plate and the keyboard plate acting to hold the slide plate and the division lever so adjusted rearwardly and adjusted reversely to normal position. A lever 52 fulcrumed at 53 to the fixed frame abuts at its upper end against a shoulder 54 of the slide plate, being so held against the tension of its spring 55, and when the division lever is adjusted to effective position as the slide plate is moved rearwardly, will be rocked rearwardly by its spring. The rock arm 24 of the full cycle stopping means has pivotally mounted thereon at 47' a push rod 47, which push rod at its other end portion has sliding engagement with a perforation 56 of said lever 52, so that upon adjustment of the division lever to effective position as the slide plate is moved rearwardly, and the consequent rearward rocking of lever 52, said push rod will be pivotally raised into line with one of the four pins 57 of a crown gear 58, said pins being spaced ninety degrees apart, and said crown gear having transmission gear connection 59 with a pinion fast upon the carriage shift shaft 21.

Thus, upon operation of rock arm 24 at the proper time, said push rod 47 will be operated to rotate the crown gear past ninety degrees, as a consequence of which the carriage shift shaft 21 will be rotated one hundred eighty degrees to shift the carriage.

The carriage 2 is pivoted at 3 in rear upon the fixed frame and is adapted to be pivotally raised to disengage the totalizer gears 13 from the transmission gears 11 of the fixed frame so that the carriage may be denominationally shifted. Means for shifting the carriage comprises a circular member 15' fast upon carriage shift shaft 21, provided with diametrically spaced rollers 15 engaging equally spaced notches 19, a series of which is provided in carriage frame rail 17, said carriage shift shaft being mounted in bearings 25' beneath the keyboard plate and having at its forward end an operating handle 27' whereby said shaft may be rotated one hundred eighty degrees clockwise to effect a right shift of the carriage of one order and counterclockwise to effect a left shift. Upon rotation of carriage shift shaft 21 past the ninety degree point, no further application of power is necessary to complete the shift, as the weight of the carriage and a pair of locators to be described will cause shaft 21 to be rotated one hundred eighty degrees. There are two identical carriage locators positioned respectively adjacent to and inwardly of the right and left sides of the fixed frame, each locator comprising a lever 35, fulcrumed to the adjacent side frame at 35', a spring 37 connected to one arm of said lever and to a stud of said frame urging the forward arm of said lever against a stop 39 of said frame, the rear arm of said lever having an extension arm 31 pivoted thereto and extending upwardly at the rear of the keyboard through a slot of guide plate 33 and being provided at its upper end with a U-shaped jaw 29' embracing the carriage frame rail 17, and through which said rail is longitudinally slidable during the shifting of the carriage. These locators thus act to pull the carriage downwardly in its fall by gravity to complete its shift. The above applies whether the carriage is shifted manually by handle 27 or automatically in a plural order program of multiplication or division. Upon shifting the carriage denominationally the lever 35 will be actuated in one direction throughout the consequent rise of the carriage and reversely actuated throughout the consequent fall of the carriage to complete a one order shift.

These carriage locators are utilized in the means of this invention for cushioning the fall of the carriage and for synchronizing therewith the operation of the means for reclosing the clutch to start a calculation of a plural order program in a new ordinal position of the carriage. This is described as follows:

*Means for cushioning the fall of the carriage*

A known centrifugal brake governor comprises diametrically opposite weights 60, connected together by coiled springs 61, said weights having pin and slot connection 62 with a hub fast upon the governor shaft 64 having bearings in the fixed frame, so that upon rotation of the governor shaft 64 said weights will by centrifugal force be driven outwardly to frictionally engage the inner rim of a fixed annular member 65 of said governor.

In order to cause the governor to idle during the raising of the carriage pivotally to clear the totalizer gears 13 from the transmission gears 11 of the fixed frame, and to cause the governor to be driven during the fall of the carriage to reengage said gears, the forward arm of said lever 35 has link connection with a crank arm 66, loose upon a shaft 67 having bearings in the fixed frame, a gear 68 loose upon said shaft 67 meshing with a pinion fast upon the governor shaft 64, a ratchet wheel 69 fast upon the hub of said crank arm 66 being rotated clockwise, during the final actuation of the forward arm of said lever 35 upwardly to, through the medium of a detent 70 mounted upon said gear 68, simultaneously rotate said gear 68 and the governor shaft 64, said ratchet wheel being ineffective to rotate said gear 68 during the preliminary actuation of said forward arm of the lever 35, downwardly, due to slippage of said detent 70 with respect to the teeth of the ratchet wheel.

*Means for synchronizing the operation of the means for cushioning the fall of the carriage with the operation of the means for reclosing the clutch*

An arm 71 is pivotally mounted upon the same pivot upon which push rod 47 is mounted on rock arm 24 of the full cycle stopping means of the machine, said arm 71 having a rearward extension 72 connected with arm 71 by a neck, which neck engages a slot 73 of the slide plate 50 and which extension overlies said slide plate to normally hold the arm 71 in raised position, against the tension of its spring 76, with a rearwardly facing shoulder 77 of said arm located above and free of engagement with a pin 78 of a rocker 79 pivoted at 80 to the fixed frame. This rocker has, spaced forwardly of said pin 78 thereof, a slot 81 engaging a pin 82 of the forward arm of said lever 35, so that when the lever 35 is actuated in opposite directions during the shifting of the carriage 2, said rocker 79 will be actuated in opposite directions.

Upon adjustment of the division lever 201 to effective position by rearward movement of slide plate 50, said slot 73 of the slide plate will be moved rearwardly from under extension 72 of arm 71 to free it from overlying engagement with the slide plate, whereupon said arm 71 will be pulled downwardly by its spring 76 to bring said shoulder 77 into the path of movement of said pin 78 of rocker 79.

Thus, upon movement of rock arm 24 of the full cycle stopping means forwardly against fixed stop 29, said arm 71 will be moved forwardly therewith, and the pin 78 of rocker 79 will follow the arm 71 forwardly; and in the rebound of rock arm 24 from fixed stop 29 and consequent reclosing of the clutch in a plural order program, the pin 78 of rocker 79 will engage the shoulder 77 of arm 71 to delay the rebound of rock arm 24 and synchronize such rebound and consequent reclosing of the clutch with the actuation of lever 35 to drive the governor and consequently cushion the fall of the carriage in its shift.

The rearward extension 72 of arm 71 is provided at its rear end with a cam edge 83, which when arm 71 is pulled downwardly by its spring will be located adjacent the rear edge of the slot 73 of the slide plate, and when the division lever 201 and the slide plate 50 are simultaneously restored, said rear edge of the slot will engage said cam edge 83 and restore said arm 71, that is to say will move it upwardly against the tension of its spring to normal position overlying the slide plate.

The division lever 201, the reversing tooth 209 and the parts associated therewith are modified from the disclosure thereof of said Overbury patent, but operate substantially in accord with said disclosure.

This is also true of the carriage shift means, with the proviso that the machine operates in accordance with the subtract-shift, add-shift method of accomplishing automatic division disclosed in said Chase patent; and is also true with respect to the means for effecting restoration of the division lever 201.

I claim:

1. In a calculating machine, a denominationally shiftable carriage having register gears, said carriage being pivoted in rear upon the fixed frame of the machine, said fixed frame having transmission gears, means for differentially actuating said register gears through the medium of said transmission gears, means for denominationally shifting said carriage comprising means for raising the carriage pivotally to clear the register gears from the transmission gears and for causing the carriage to fall by gravity to reengage said gears, power driven means to effect repeated alternate operation of said differential actuating means and said carriage shift means comprising a clutch, and means comprising a manipulable key to close the clutch and initiate operation of the machine, said power driven means also comprising means to open the clutch upon the conclusion of a calculation of a plural order program in any one ordinal position of the carriage and means to thereafter reclose the clutch to start the calculation in the new ordinal position of the carriage; in combination with means for cushioning the fall of the carriage comprising a brake governor and follower means having connection with the carriage and means of connection with said governor to cause the governor to idle during the rise of the carriage and to drive the governor during the fall of the carriage, and means having connection with said follower means for synchronizing the operation of said means for cushioning the fall of the carriage with the operation of the means for reclosing the clutch.

2. In a calculating machine, a denominationally shiftable carriage having register gears, said carriage being pivoted upon the fixed frame of the machine, said fixed frame having transmission gears, means for differentially actuating said register gears through the medium of said transmission gears, means for denominationally shifting said carriage comprising means for raising the carriage pivotally to clear the register gears from the transmission gears and for causing the carriage to fall by gravity to reengage said gears, power driven means to effect repeated alternate operation of the differential actuating means and the carriage shift means comprising a clutch, and means comprising a manipulable key to close the clutch and initiate operation of the machine, said power driven means also comprising means to open the clutch upon the conclusion of a calculation of a plural order program in any one ordinal position of the carriage and means to thereafter reclose the clutch to start the calculation in the new ordinal position of the carriage; in combination with means for cushioning the fall of the carriage comprising a brake governor and follower means having connection with the carriage and means of connection with said governor to cause the governor to idle during the rise of the carriage and to drive the governor during the fall of the carriage, and normally ineffective means having connection with said follower means for synchronizing the operation of the means for cushioning the fall of the carriage with the operation of the means for reclosing the clutch comprising means for rendering it effective upon adjustment of the manipulable key to effective position and for restoring it upon restoration of said key.

3. In a calculating machine, a denominationally shiftable carriage having register gears, said carriage being pivoted upon the fixed frame of the machine, said fixed frame having transmission gears, means for differentially actuating said register gears through the medium of said transmission gears, means for denominationally shifting said carriage comprising means for raising the carriage pivotally to clear the register gears from the transmission gears and for causing the carriage to fall by gravity to reengage said gears, power driven means to effect repeated alternate operation of the differential actuating means and the carriage shift means comprising a clutch, and means comprising a manipulable key to close the clutch and initiate operation of the machine, said power driven means also comprising means to open the clutch upon the conclusion of a calculation of a plural order program in any one ordinal position of the carriage and means to thereafter reclose the clutch to start the calculation in the new ordinal position of the carriage; in combination with means for cushioning the fall of the carriage comprising a follower lever having connection with the carriage to actuate it in opposite directions during the rise and fall of the carriage, and a centrifugal brake governor, said follower lever having means of connection with said governor to cause the governor to idle during the rise of the carriage and to drive the governor during the fall of the carriage, and means for synchronizing the operation of the means for cushioning the fall of the carriage with the operation of the means for reclosing the clutch comprising a manipulable slide plate engaging said key to adjust it to effective position and restorable upon restoration of said key, and a rocker having connection with said follower lever to actuate the rocker in opposite directions, said rocker having a pin, said means for reclosing the clutch having a spring-retracted arm provided with a shoulder, said arm having means of engagement with said slide plate to hold the arm normally raised and to release the arm to cause it to be pulled down by its spring and the shoulder thereof to contact said pin upon manipulation of said slide plate.

HERMAN GANG.

REFERENCES CITED

The following references are of record in the file of this patent:

UNITED STATES PATENTS

| Number | Name | Date |
| --- | --- | --- |
| 1,180,410 | Monroe et al. | Apr. 25, 1916 |
| 1,384,592 | Britten | July 12, 1921 |
| 1,773,027 | Chase | Aug. 12, 1930 |
| 1,947,620 | Schluns | Feb. 20, 1934 |
| 1,964,211 | Overbury | June 26, 1934 |
| 1,964,478 | Overbury | June 26, 1934 |
| 2,273,251 | Chase | Feb. 17, 1942 |
| 2,291,133 | Avery | July 28, 1942 |
| 2,304,231 | Avery | Dec. 8, 1942 |
| 2,419,760 | Britten | Apr. 29, 1947 |